Patented July 30, 1940

2,209,752

UNITED STATES PATENT OFFICE 2,209,752

MAGNESIUM CARBONATE COMPOSITION AND PROCESS FOR THE PREPARATION THEREOF

Samuel A. Abrahams, San Francisco, Rubin Lewon, Menlo Park, and Louis L. Collonge, Palo Alto, Calif., assignors to Plant Rubber & Asbestos Works, San Francisco, Calif., a corporation of California No Drawing. Application June 9, 1938, Serial No. 212,696

2 Claims. (Cl. 23—67)

Our invention relates to magnesium carbonate compositions, and more particularly to an improved magnesium carbonate composition which has the property of self or hydraulically setting substantially without shrinkage, and also to an improved process for producing such self-setting composition.

Magnesium carbonates are used in sound and heat insulating and similar materials, and have generally comprised either the heavy basic carbonate or the light basic carbonate, or modifications of these materials. These basic carbonates have been prepared by various methods. One form of commercial process for manufacturing such basic carbonates, where dolomitic material is the source of raw material and it is desired to eliminate calcium compounds from the final product, is to calcine first the dolomitic material to form magnesium and calcium oxides which are treated with water to provide an aqueous suspension of magnesium and calcium hydroxides. Such suspension is gassed with carbon dioxide-containing gas, which results in a permanently insoluble precipitate of calcium carbonate, and an initial precipitate of magnesium carbonate. Upon continued gassing, the magnesium carbonate dissolves in the form of magnesium bicarbonate which is water-soluble. In order to effect separation of the calcium carbonate, it is customary commercial practice to gas to the point where substantially all the magnesium is in the form of the water-soluble magnesium bicarbonate, which step enables the calcium carbonate to be removed by filtration.

To obtain magnesium carbonates from the water-soluble magnesium bicarbonate, the magnesium bicarbonate solution is generally heated rapidly to the boiling point, which results in the precipitation of basic magnesium carbonate. If desired, basic magnesium carbonate may be prepared from magnesite in substantially the same manner by calcining the magnesite to form magnesium oxide; treating the magnesium oxide with water to thus form an aqueous suspension of magnesium hydroxide; and gassing such suspension with carbon dioxide-containing gas to form the water-soluble magnesium bicarbonate, which results after initial precipitation of magnesium carbonate. Where dolomitic material is the source of raw material, the magnesium bicarbonate solution will usually contain about 1% to 2% by weight of dissolved magnesia calculated as magnesium bicarbonate. Where magnesite is the raw material, the concentration of magnesium bicarbonate will be slightly higher.

In such prior methods, it was necessary in order to form the magnesium carbonate in blocks or slabs of the desired size or shape, to mold the product under a relatively high mechanical pressure, because the magnesium carbonate did not have self-setting properties or could not undergo a hydraulic set. This molding equipment was expensive to maintain and operate as well as to construct. Furthermore, because of the pressure applied during the molding, the product was compacted and consequently made more dense than would occur in a corresponding product having self-setting properties. This, of course, rendered it impractical to intermix with such prior product comparatively large quantities of other heavier materials which might otherwise have been desirable, because the increased density which resulted from such large quantities produced a product having a unit weight too high for commercial specifications. Consequently, the percentages of these foreign materials which could be included was limited.

Our invention has as its objects, among others, the provision of an improved light weight self-setting magnesium carbonate composition having great strength and improved insulating properties, and which can be produced by a comparatively economical process. Other objects of the invention will become apparent from a reading of the following description thereof.

In general, we have discovered that magnesium carbonate having self-setting properties may be formed by decomposition of a magnesium bicarbonate-containing solution. Briefly, such decomposition is effected by excessively agitating a solution containing magnesium bicarbonate, which effects driving off of carbon dioxide, and preferably simultaneously applying a moderate degree of heat to expedite the driving off of the carbon dioxide. This results in the precipitation of fine needle-like normal magnesium carbonate crystals having self-setting properties. Care must be taken to preclude destruction of such normal magnesium carbonate crystals, which would occur should the decomposition reaction be conducted at too high a temperature. Addition of active or caustic magnesium oxide, i. e., magnesium oxide which is not dead burnt, to the magnesium bicarbonate solution is desirable as it has been found to hasten the decomposition reaction. Although such self-setting normal magnesium carbonate crystals are usually formed under most present commercial operating conditions as an intermediate product during the decomposition reaction, their self-setting properties were not recognized, and they were heretofore destroyed by application of heat at too high a temperature.

If a slurry of such normal magnesium carbonate crystals having self-setting properties is cast or poured into a form or mold, the composition will set in a quiescent state without application of mechanical pressure thereto, to provide the self-setting product of our invention. The setting in the mold is enhanced by application of heat. In other words, we have found that a normal magnesium carbonate in the form of comparatively thin needle-like crystals resulting from the described decomposition of an aqueous magnesium bicarbonate-containing solution, has hydraulic or self-setting properties rendering it unnecessary to mold the composition under pressure to form slabs or blocks. Although the product of our invention has the property of self-setting in a quiescent state without application of pressure thereto, and this is the manner employed by us for producing the product, it will also set if pressure is applied as in other methods heretofore known, and still produce a stronger product than has heretofore been possible by such other methods. Inasmuch as pressure molding is necessary to produce a satisfactory product manufactured by other methods, and in view of the fact that pressure may be applied to the product made by the process of our invention but is not necessary, the expression "independent of pressure" is employed hereinafter to describe that the product of our invention has self-setting properties not conditioned on pressure.

The process of our invention is applicable to any aqueous magnesium bicarbonate-containing solution, irrespective of how such magnesium bicarbonate solution may be prepared. However, it has particular applicability where dolomitic material is employed as the source of raw material and it is desired to remove calcium compounds, because under this condition it is necessary to prepare the magnesium bicarbonate solution in the manner previously related. For all the magnesium to be substantially dissolved in the solution in the form of the bicarbonate, where dolomitic material is the raw material, enough water should be employed to provide a concentration of magnesium of at least about 1% to 2% by weight of the solution, calculated as magnesium bicarbonate. A solution of this strength will be substantially concentrated. However, the process of our invention is applicable to more dilute solutions, as well as to more concentrated solutions which obtain where magnesite is the source of raw material, but obviously if the solutions are too dilute this would be undesirable for commercial reasons because of unnecessary water bulk and the greater cost which would be involved in heating such water.

Vigorous or excessive agitation is important in effecting decomposition of the magnesium bicarbonate, and we have found that the more vigorous the agitation, the more efficacious the decomposition. Mechanical agitation by any suitable agitating mechanism may be employed, but agitation by introducing a stream or streams of compressed air into the vessel in which the reaction occurs is more desirable. Such vessel is preferably open to the atmosphere as the reaction occurs under atmospheric conditions, although it can also be obtained in a vessel maintained under a vacuum, but this is unnecessary. Application of pressure over the vessel would be undesirable because this would interfere with the driving off of carbon dioxide from the magnesium bicarbonate as it decomposes, and thereby impede the decomposition reaction. Agitation has been found to form small and thin crystals which are desirable because the smaller and thinner the crystals, the stronger the final product. This is probably due to the fact that with small thin crystals there is a greater interlacing thereof to provide a firmer bond upon setting of the product.

As was previously related, heat is preferably applied simultaneously with excessive agitation to expedite the decomposition of the magnesium bicarbonate, with consequent precipitation of the normal self-setting magnesium carbonate crystals. However, care must be taken that the temperature is not allowed to rise at any time above the point where the fine needle-like normal magnesium carbonate crystals which are formed lose their character, because then their self-setting properties are destroyed. The temperature should not be permitted to rise much above 120° F.

At present, the process is preferably performed in batches. Live steam introduced directly into the batch provides a suitable heating means and also cooperates to effect agitation. Hence, it is preferred, although any other suitable heating means, such as heating coils in the vessel or external heat, may be employed instead. If some of the normal magnesium carbonate crystals from the first batch are left in the vessel, such crystals serve as a seeding means and expedite formation of succeeding crystals in subsequent batches.

The higher the temperature at which the decomposition is effected, other conditions remaining the same, the more rapid will be the driving off of carbon dioxide from the magnesium bicarbonate. Therefore, it is preferred to conduct the process close to the highest temperature which may be safely employed without impairing the self-setting properties of the crystals. Such temperature, as mentioned above, should not be much over 120° F. At about this temperature, coupled with the vigorous agitation, it will usually take from about one to one and one-half hours to decompose as much as the magnesium bicarbonate as it is commercially practical to decompose from the mother liquor containing such magnesium bicarbonate in solution. This is so because the decomposition of the magnesium bicarbonate is quite rapid during the first half hour of the reaction, and then further decomposition occurs at a decreasingly slower rate. Hence, it would be commercially uneconomical to attempt to decompose all the magnesium bicarbonate at the moderate temperature which should be employed, coupled with vigorous agitation. However, the magnesium bicarbonate which remains in solution in the mother liquor need not be lost, because such mother liquor may be removed from the crystalline magnesium carbonate precipitate and used for treating the original source of magnesium oxide-containing material from which the magnesium bicarbonate solution is to be prepared. Although substantially all of the magnesium bicarbonate could be decomposed by boiling the magnesium bicarbonate solution, this is objectionable for the reasons already explained.

Instead of allowing the decomposition reaction to continue for about one to one and one-half hours, it may be commercially desirable to remove the crystalline normal magnesium carbonate precipitate from the mother liquor after about one-half hour, which is about the time when the rate of decomposition commences to slow up materially. The operator or observer will be able to determine readily the rate of decomposition of the magnesium bicarbonate as well as how much of the magnesium bicarbonate has been decomposed, by removing at regular intervals successive sample filtrates of the magnesium bicarbonate solution, and titrating such samples with acid, such as sulphuric acid. As the magnesium bicarbonate decomposes, less acid is required to titrate the successive sample filtrates thereof. Suitable amounts of active or caustic magnesium oxide, if desired, may be added to the magnesium bicarbonate solution to aid in the decomposition thereof, to thereby hasten the reaction, but the addition of the magnesium oxide is not necessary.

It is also desirable to take frequent successive samples from the batch as the reaction progresses and make microscopic analyses of the crystals in such samples to insure that proper self-setting crystals are being formed. The proper kind of crystals will appear under the microscope to be substantially all in the form of very fine (not fat), needle-like crystals, ranging from 20 to 50 microns in length and from 2 to 5 microns in thickness. When the decomposition reaction has reached the desirable point for stopping the reaction, agitation and the application of heat are terminated; and the crystals are ready for succeeding steps of the process.

We prefer to add directly to and mix in the reaction vehicle, the usual types of reenforcing materials, such as asbestos fiber, in an amount sufficient to provide a final product which contains from 10% to 15% by weight of the fiber: such product being generally that employed commercially for heat insulation. Other chemically inactive solid bodies, such as vermiculite or diatomaceous earth, may be also mixed in the reaction vehicle. However, such inert filler or reenforcing fiber may be introduced at any suitable subsequent or prior point if so desired.

When the normal magnesium carbonate precipitate is in the form of the desired crystals, and the other material is added to the reaction vehicle, any water-soluble impurities which might be present in the precipitate including magnesium bicarbonate, may be removed by filtration and washing, and the water content of the mass simultaneously adjusted by removal of excess water to control the density of the final set product. A suitable type of filter is an "Oliver" continuous rotary vacuum filter in which removal of excess water, filtration and washing may be done simultaneously. In the particular process herein described, the washing is not necessary if after removal of excess water from the reaction vehicle, in any suitable manner, such as by decantation, any water-soluble magnesium bicarbonate remaining in the slurry, which is undesirable because it has been found to slow up subsequent setting, is neutralized or decomposed completely. For this purpose, we may add sufficient magnesium oxide to the slurry to react with substantially all the magnesium bicarbonate therein to precipitate magnesium carbonate. Lime or any other alkali which will react with water-soluble magnesium bicarbonate to precipitate an insoluble carbonate may be employed instead of the magnesium oxide; the magnesium oxide being preferred to lime because it does not adulterate the product and because it imparts additional strength to the final product. The addition of the neutralizing medium or washing is not necessary but the employment of either one is desirable for the reasons stated.

The resulting normal magnesium carbonate slurry, after separation of the desired amount of water, is now ready to be set. If the resultant slurry is not already markedly alkaline by virtue of the addition thereto of magnesium oxide or equivalent material should washing of the slurry be omitted, we preferably intermix with the slurry to hasten and also control the setting of the product in the molds, and at the same time increase the strength of the final product, an excess of an alkali having the property of consuming carbon dioxide which may be by absorption, adsorption or reaction, such as preferably caustic or active magnesium oxide, an alkali metal hydroxide such as sodium hydroxide, or borax, for a reason to be subsequently explained. Other alkalies, such as lime, may also be employed, but alkalies of this type are not preferred because they cause too much adulteration of the final product. In this connection, enough alkali should be added to render the slurry markedly alkaline, as the slurry has been found to set better when markedly alkaline.

In the setting operation, the slurry is cast or poured directly into forms or molds which are heated for a length of time and at a temperature sufficient to set the slurry or sludge to a firm cake. Agitation of the crystals in the molds is avoided because such agitation will impair the setting of the crystals. Hence, the setting in the molds is accomplished with the crystals in a quiescent state. The composition has substantially no shrinkage on setting and no pressure need be applied to it to accomplish the setting. Consequently, the density of the final product is governed by the quantity of water left in the slurry which is poured into the molds.

During the setting, we have found that carbon dioxide gas is given off; and microscopic observation of the set product shows that the material which was originally all comparatively thin or fine needle-like crystals now consists essentially of a mixture of two crystal forms. Some of the original needle-like crystals remain, but a new very small crystal appears. Such new crystal tends to cluster into grape-like groups, or to adhere to the surface of the needle-like crystals. This probably accounts for the great strength of the final product, which breaks with a clean fracture, in contradistinction to the product of the prior processes, which mushes upon being broken, thus indicating that the product of our invention is bonded by the interlacing of the crystals.

Because of the evolution of the carbon dioxide and the formation of the new crystals, we are led to believe that a reaction probably occurs in which some of the carbonate of magnesium is converted to light basic magnesium carbonate. The carbon dioxide-consuming alkali which is preferably added to the slurry prior to the setting operation, controls and hastens the setting which is preferably conducted in an enclosed chamber, not only because the setting occurs faster when the slurry is made markedly alkaline, but also because the consumption of some of the carbon dioxide reduces the carbon dioxide pressure in such chamber, and thus by the principle of the law of mass action causes the reaction to proceed faster toward the side of the set product.

Also, such alkali since it consumes carbon dioxide, controls the rate of evolution thereof and precludes formation of fissures in the interior of the setting product which might otherwise result from too rapid an evolution of the carbon dioxide, with consequent weakening of the final product. For any given setting conditions, the length of time of the set may be regulated by the quantity of the carbon dioxide-consuming alkali which may be added to the slurry; the more alkali added within practical limits, the faster being the set. If magnesium oxide alone is added, usually an amount thereof ranging from 1% to 5% by weight of magnesium carbonate, is employed; while borax alone is used in an amount usually ranging from 1% to 2% by weight of magnesium carbonate. An alkali metal hydroxide, such as sodium hydroxide, being much stronger, is employed in lesser quantities; 0.1% to 1% by weight of magnesium carbonate being usually sufficient. Mixtures of the carbon dioxide-consuming alkalies may, of course, be employed if so desired. The addition of the carbon dioxide-consuming alkali, although very desirable for enhancing the set and increasing the strength of the final product, is not essential.

Although no pressure is required to compact or mold the material, pressure molding may be employed and still produce a superior product, or a special dense product for certain purposes. However, such pressure molding is preferably omitted where the final product is intended for heat insulation, inasmuch as it would increase the density. The temperature applied to the molds during setting should not be too high or applied too rapidly, because although the product will set, the evolution of gas is so rapid as to leave the final product with gas holes. Neither should the temperature be too low, because then the setting is, generally speaking, too slow for practical purposes. A suitable temperature range under atmospheric pressure is substantially from 140° F. to 195° F. At this temperature range, the setting to a hard cake will usually occur in from one-half to three hours, the time varying with the temperature actually applied, and also with the chemical and physical character of the composition, as well as the thickness of the mass. Preferably, the setting is effected by placing the slurry filled molds in an enclosure maintained at the desired temperature by live steam, although any other suitable heat may be employed instead. It is desirable that the enclosure in which the setting is conducted be substantially free of drafts to the outside atmosphere because drafts might cause evaporation of moisture and this tends to cause undesirable shrinkage.

The composition sets normally substantially without shrinkage which is important, because if it were to shrink materially, then of course its final shape could not be fixed by the mold, and wasteful trimming would have to be employed to produce the desired shape block or slab. Also, by not shrinking, the density of the product is not increased during the setting thereof, which is important for controlling the final weight of the product, as determined by the amount of water which is in the slurry to be set. In this connection, if the slurry does not have the desired water content to produce the desired density of the final product, water may be added to the slurry in an amount necessary to produce the desired density. Thus, the density of the final product may be controlled by adjusting the water content of the slurry to be set. Under some circumstances, slight shrinkage of the composition might occur during setting, but not as much as the shrinkage which occurs in other commercial processes wherein mechanical pressure molding of the composition is absolutely necessary to produce a satisfactory product.

After having set in molds, the blocks or slabs which are formed are self supporting before they are dry and while containing considerable moisture. Blocks or slabs formed in other commercial processes where the magnesium carbonate is placed in filter molds and pressure molding is employed simultaneously with expulsion of water through perforations in the molds, are not self supporting; and consequently, they have to be supported in frames after they are removed from the molds, so that they will not break during handling prior to drying thereof. The method of our invention, therefore, eliminates the necessity of having to provide frames to support the molded product after removal from the molds.

Upon removal of the slabs or blocks from the molds after setting thereof, they are next dried in the usual manner heretofore employed for drying the mechanically molded product. Such drying is accomplished usually in conventional drying ovens at a temperature ranging from 155° F. to 395° F., to remove all uncombined or free water not existing as water of crystallization. Depending on the temperature and draft, it will take from 24 to 72 hours for the drying. The drying, if desired, may be air drying, but oven drying is preferred because it is faster. Should the material tend to stick in the molds upon removal therefrom, the molds may be first greased with any suitable substance such as petroleum grease.

Even though there is substantially no shrinkage of the material in the molds, it may be desirable to mill or trim the surfaces of the dried product so as to provide an attractive product not marred with surface imperfections. Not over 10% of the product need be removed by such milling, whereas with products produced by other methods wherein molding under pressure is required, the amount of product removed by milling runs from 30% to 40%. The milled-off material is not entirely waste material because it may be used for making magnesia insulating cement. However, it has less value as a cement, and therefore results in an economic loss. Hence, because of the lesser amount of material which need be trimmed from the block or slab of our invention, a further economy results. Because the product of our invention sets in a quiescent state substantially without shrinkage, the molds may be made of special shapes so as to form correspondingly shaped insulating fittings.

Standard commercial products of magnesium carbonate insulating blocks produced by former pressure molding methods contain about 85% by weight of magnesium carbonate as a bonding agent and about 15% by weight of asbestos fiber to reenforce the product. Under present standards, such blocks weigh from 16 to 18 lbs. per cubic foot; the specific gravity, therefore, ranging from .25 to .28. The similar product of our invention containing the same percentages of magnesium carbonate and asbestos fiber can be made to weigh as low as 9 lbs. per cubic foot, and will average from 10 to 12 lbs. per cubic foot; the specific gravity, therefore, ranging from .14 to .19. The product of our invention will thus average from 35% to 45% lighter than the corresponding product produced by former methods; and even though lighter, it is much stronger. This comparison between 85% magnesium carbonate blocks of our invention and those heretofore produced holds true for any given specification of materials and percentages of magnesium carbonate in the respective blocks. Because of the lightness of the product of our invention, considerable saving in freight charges obtains. Also, due to the low density of our product, it has a lower heat conductivity coefficient than that of products produced by former methods. The heat conductivity coefficient of the product of our invention will run about 20% lower than the corresponding product produced by former methods and containing the same percentages of ingredients.

Although the product of our invention is lighter, it is much stronger than heretofore produced products. Weight for weight, it is 50% to 100% stronger; while a block of our invention, for example an 85% magnesium carbonate block weighing 11 lbs. per cubic foot, will be as strong or even stronger than the corresponding block produced by former methods and averaging 16 to 18 lbs. per cubic foot.

The product of our invention because of its light weight, is highly porous, i. e., cellular in structure, which is one of the factors enabling it to have a high heat insulating efficiency. Furthermore, although the product is shaped, it is not stony or rock-like in character as are artificial stones or natural rocks, but it is chalk-like in character. In other words, compared to an artificial stone or natural rock, it is relatively soft or crushable; the material being readily rubbed off from the surface thereof.

Reference is made to our assignee's copending applications, Serial No. 212,698, filed June 9, 1938, and Serial No. 260,663, filed March 8, 1939, containing related subject matter.

We claim:

1. The method of producing a set magnesium carbonate composition which comprises decomposing magnesium bicarbonate in solution to provide a precipitate of a normal magnesium carbonate in the form of needle-like crystals having self-setting properties, terminating the reaction prior to conversion of said self-setting magnesium carbonate crystals to basic magnesium carbonate so that said self-setting magnesium carbonate crystals form the final precipitate for production of the product to be set, casting a slurry containing such crystals into a form prior to setting thereof, and applying heat to the slurry in the form to enhance setting of such slurry to a firm cake.

2. The method of producing a set magnesium carbonate composition which comprises decomposing magnesium bicarbonate in solution by application of heat and agitation of the solution to provide a precipitate of normal magnesium carbonate in the form of comparatively thin needle-like crystals having self-setting properties independent of application of pressure, controlling the temperature to avoid formation of basic magnesium carbonate with consequent destruction of the self-setting properties of such precipitate, terminating the reaction prior to conversion of said self-setting magnesium carbonate crystals to basic magnesium carbonate so that said self-setting magnesium carbonate crystals form the final precipitate for production of the product to be set, prior to setting thereof casting a slurry containing such crystals into a form adapted to provide the shape of the final product, and applying heat to the slurry in the form to enhance setting of such slurry to a firm cake.

SAMUEL A. ABRAHAMS.
RUBIN LEWON.
LOUIS L. COLLONGE.